United States Patent [19]

Nakamura et al.

[11] Patent Number: 4,713,699
[45] Date of Patent: Dec. 15, 1987

[54] A METHOD OF CONTROLLING THE MOVEMENT OF A MEDIUM TO BE PRINTED

[75] Inventors: Kozoo Nakamura, Hitachiohta; Yasuyuki Kozima; Nagaharu Hamada, both of Hitachi; Kunihiro Sakata, Hayama, all of Japan

[73] Assignee: Hitachi, Ltd., Tokyo, Japan

[21] Appl. No.: 837,679

[22] Filed: Mar. 10, 1986

[30] Foreign Application Priority Data

Mar. 8, 1985 [JP] Japan .................................. 60-44846

[51] Int. Cl.$^4$ ...................... H04N 1/22; G03G 15/00
[52] U.S. Cl. .................................. 358/296; 358/300; 355/3 R
[58] Field of Search ....................... 358/296, 300, 302; 346/76 PH, 136, 1.1; 355/3 R, 14 R, 20

[56] References Cited

U.S. PATENT DOCUMENTS 4,367,943  1/1983  Nakamura .................. 346/161 X

FOREIGN PATENT DOCUMENTS 581579  6/1981  Japan .
58-205372 11/1983  Japan .

*Primary Examiner*—E. A. Goldberg
*Assistant Examiner*—Linda M. Peco
*Attorney, Agent, or Firm*—Antonelli, Terry & Wands

[57] ABSTRACT

The present invention provides a method for controlling the movement of a print medium to be printed, for example, in a facsimile device. The invention uses printing velocities for each line (or printing unit) to be printed, which are calculated based on the number of black picture elements in the image signal related to this line (or picture unit). These calculated printing velocities are stored each for succeeding line to be printed and are then used to determine the moving velocity of the print medium for the actual line being printed.

8 Claims, 17 Drawing Figures

LINE NUMBERS
□ : PRINTING VELOCITY
○ : PAPER FEEDING VELOCITY

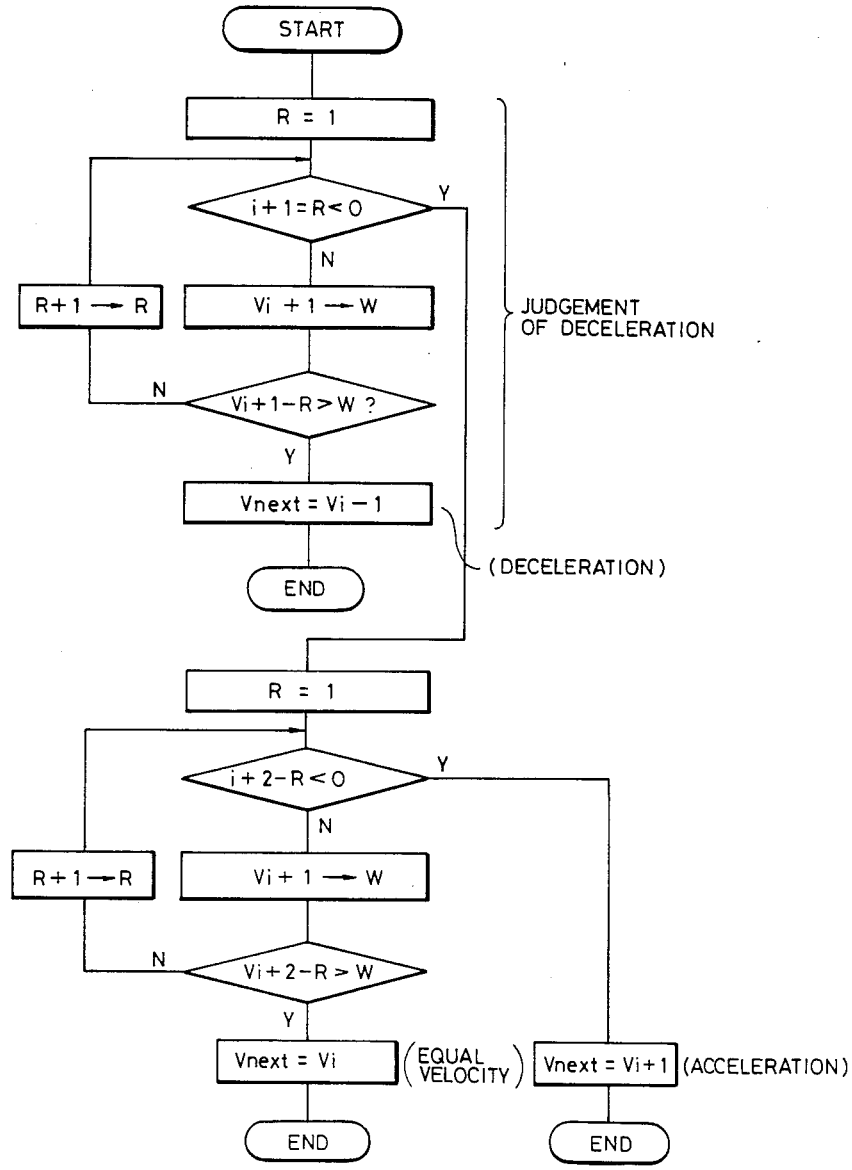

FIG. 12

| LINE NUMBER | TRANSMISSION PERIOD | BLACK PERCENTAGE | RECORDING VELOCITY (line/s) |
|---|---|---|---|
| 1 | 4ms | WHOLE WHITE | 200 |
| 2 | " | " | " |
| 3 | " | " | " |
| 4 | " | " | " |
| 5 | " | " | " |
| 6 | 20ms | SMALL BLACK PERCENTAGE | 100 |
| 7 | " | " | " |
| 8 | 100ms | LARGE BLACK PERCENTAGE | 50 |
| 9 | " | " | " |
| 10 | 20ms | SMALL BLACK PERCENTAGE | 100 |
| 11 | " | " | " |
| 12 | 4ms | WHOLE WHITE | 200 |
| 13 | " | " | " |
| 14 | " | " | " |
| 15 | " | " | " |
| 16 | " | " | " |
| 17 | " | " | " |
| 18 | " | " | " |
| 19 | " | " | " |
| 20 | " | " | " |
| 21 | " | " | " |
| 22 | " | " | " |

A METHOD OF CONTROLLING THE MOVEMENT OF A MEDIUM TO BE PRINTED

BACKGROUND OF THE INVENTION

The present invention relates to a facsimile apparatus or the like using an information source coding system, for example, and having printing means and, more particularly, to a method of controlling the movement of a paper at a printing velocity different in accordance with the content of image signals.

In an apparatus such as a Prior Art facsimile as is disclosed in Japanese Patent Laid-Open No. 58-1579, the printing velocity can be increased by simultaneously printing as many divided sections as possible so long as the total number of heating registers to be powered simultaneously does not exceed a predetermined value and by printing one line (or printing unit) of a predetermined length. However, the system is disadvantageous in that it uses a stepping motor, or the like, as a paper feeding motor acting as paper feeding means for moving a paper at a limited velocity, because the vertical scanning velocity (i.e., the paper feeding velocity) must be abruptly decelerated or accelerated in a minimum amount of time. As is disclosed in Japanese Patent Laid-Open No. 58-205372, moreover, the prior art apparatus is caused to select smooth acceleration or deceleration (or a uniform rate of the vertical scanning velocity) according to the number of bits stored in a code buffer memory and the number of bits of image signals stored in a line memory. However, no consideration is given to fluctuations of the printing time period of each line (or Printing Unit). In case the image signals are coded by MH (i.e., Modified Huffman) codes or the international standard codes of facsimile, code and line buffers are required to have large capacities with complicated controls so that they may neither overflow nor underflow, because the transmission time period of each line fluctuates about several hundred times according to the content of the image signals.

SUMMARY OF THE INVENTION

An object of the present invention is to provide a method of controlling the movement of a paper to be printed, by a facsimile receiver or the like equipped with a printing means where moving means and the printing velocity fluctuates in accordance with, for example the number of black picture elements in the image signals of each line, such that the paper moves smoothly at a high velocity.

According to a first feature of the present invention, there is provided a method of controlling the movement of a paper to be printed, comprising:

printing means for printing image signals on a paper by printing units of a predetermined length and at a printing velocity different in accordance with the content of said image signals; and moving means for moving said paper, based on each of the printing units at a predetermined decelerating (or accelerating) rate of a moving velocity, wherein the improvement resides in that, by using an actual moving velocity at an arbitrary i-th (wherein i=1, 2, 3, - - - , and I) printing unit as a first virtual moving velocity at an (i+1)-th printing unit, an actual moving velocity at said (i+1)-th printing unit is determined by:

a second virtual moving velocity at an (i+k)-th (wherein k=1, 2, - - - , ≦I−i) printing unit which is determined by decelerating (or accelerating) from said first virtual moving velocity at said (i+1)-th printing unit according to said decelerating (or accelerating) rate; and a printing velocity at said (i+k)-th printing unit.

According to a second feature of the present invention, there is provided a method of controlling the movement of a paper to be printed, comprising:

printing means which prints image signals on a paper by printing units of a predetermined length and whose printing velocity is different in accordance with the content of said image signals; and moving means which moves the paper, based on each of the printing units, whose moving velocity is determined by a predetermined decelerating (or accelerating) rate of a moving velocity, wherein the improvement resides in that, by using an actual moving velocity at an arbitrary i-th (wherein i=1, 2, 3, - - - , and I) printing unit as a first virtual moving velocity at an (i+1)-th printing unit, an actual moving velocity at said (i+1)-th printing unit is determined by:

a second virtual moving velocity at an (i+k)-th (wherein k=1, 2, - - - , ≦I−i) printing unit which is determined by decelerating (or accelerating) from said first virtual moving velocity at said (i+1)-th printing unit according to said decelerating (or accelerating) rate;

by using a moving velocity which is determined by accelerating (or decelerating) from said actual moving velocity at said i-th printing unit, according to an arbitrary accelerating (or decelerating) rate, as a third virtual moving velocity at said (i+1)-th printing unit, a fourth virtual moving velocity at said (i+k)-th printing unit which is determined by decelerating (or accelerating) according to said decelerating (or accelerating) rate from said third virtual moving velocity at said (i+1)-th printing unit; and a printing velocity at said (i+k)-th printing unit.

According to a preferred embodiment of the present invention, the moving velocity at said (i+1)-th printing unit is determined to be equal to or lower than the printing velocity at said (i+1)-th printing unit.

According to another preferred embodiment of the present invention:

(a) in case said printing velocity at said (i+k)-th printing unit is lower (or higher) than said second virtual moving velocity at said (i+k)-th printing unit, a fifth virtual moving velocity at said (i+1)-th printing unit which is determined by decelerating (or accelerating) from said actual moving velocity at said i-th printing unit according to said decelerating (or accelerating) rate is used as:

said actual moving velocity at said (i+1)-th printing unit;

(b) in case said printing velocity at said (i+k)-th printing unit is equal to or higher than said second virtual moving velocity at said (i+k)-th printing unit and lower than said forth virtual moving velocity at said (i+k)-th printing unit.

said first virtual moving velocity at said (i+1)-th printing unit is used as:

the moving velocity at said (i+1)-th printing unit; and (c) in case said printing velocity at said (i+k)-th printing unit is equal to or higher than said fourth virtual moving velocity at said (i+k)-th printing unit, said third virtual moving velocity at said (i+1)-th printing unit is used as:
the moving velocity at said (i+1)-th printing unit.

According to a further preferred feature of the present invention, the value k is increased sequentially from 1.

BRIEF DESCRIPTION OF THE DRAWINGS

FIG. 11 is a processing flow chart showing a processing 200 to FIG. 3;

FIG. 12 is a diagram showing one example of the relationship between image information and the printing velocity.

DESCRIPTION OF THE PREFERRED EMBODIMENTS

Figure 1:
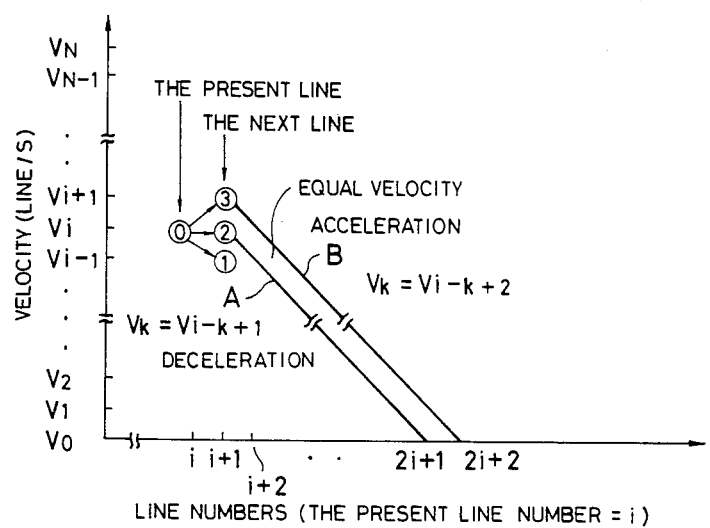
FIG. 1 is a diagram showing the principle of one embodiment of the present invention.

The present invention will be described in the following in connection with one embodiment thereof with reference to the accompanying drawings. FIG. 1 shows the principle of the embodiment of the present invention for explaining the case, in which the actual moving velocity at an (i+1)-th printing unit, i.e., the paper feeding velocity $V_{next}$ of the next line is to be determined (wherein $V_{n-1} < V_n$). In a paper feeding sytem of the present invention, the moving velocities (from the maximum velocity $V_{max}$ measured in lines/sec to a stop velocity $V_0$) of a paper feeding motor, acting as moving means, are divided into N stages and moving velocities are changed one stage at a time. In addition, both the accelerating and decelerating rates are set in advance so as to realize a smooth paper feed. In the present embodiment, the actual moving velocity of the paper to be printed, at an arbitrary printing unit is presumed to be equal to or lower than the printing velocity at said arbitrary printing unit. In other words, the amount of time the printing means requires to scan and print a horizontal line is less than or equal to the amount of time required before the paper is vertically moved to a next line.

In FIG. 1, the abscissa designates an arbitrary i-th (wherein i=1, 2, 3, - - -, and I) printing unit, i.e, line numbers which are assigned sequentially by setting the number of a present line at i, whereas the ordinate designates a velocity (lines/sec). If the paper feeding velocity of a present line for providing an actual moving velocity at the i-th printing unit is designated as $V_i$ (as shown at ⓪ in FIG. 1), if the paper feeding velocity of a succeeding k-th line for providing a virtual moving velocity at an (i+k)-th printing unit is designated as $V_k$, and if the printing velocity of a succeeding k-th line for providing a printer velocity at the (i+k)-th printing unit is designated at $W_k$, then the paper feeding velocity of the next line is determined in the following manner (wherein k=1, 2, - - -, ≦I-i).

By using the actual moving velocity $V_i$ at the arbitrary i-th printing unit (of the present line) as a first virtual moving velocity $V_i$ (as shown at ② in FIG. 1) at the (i+1)-th printing unit (of the next line), a second virtual moving velocity at the (i+k)-th printing unit (of the succeeding k-th line) which is determined by decelerating from the first virtual moving velocity $V_i$ at the (i+1)-th printing unit (of the next line) according to a predetermined decelerating rate expressed by $V_k = V_{i-k+1}$. A deceleration curve A, appearing in FIG. 1, designates a set of the second virtual moving velocity of $V_k = V_{i-k+1}$.

In the present embodiment, it is determined whether the actual moving velocity at the (i+1)-th printing unit (of the next line) is to be decelerated from the actual moving velocity $V_i$ to $V_{i-1}$ in accordance with said deceleration curve A and the printing velocity $W_k$ at the (i+k)-th printing unit (of the succeeding k-th line).

In case the printing velocity $W_k$ at the (i+k)-th printing unit (of the succeeding k-th line) is not higher than the second virtual moving velocity $V_{i-k+1}$ at the (i+k)-th printing unit (of the succeeding k-th line), i.e., in the following case:

$$W_k < V_{i-k+1} \qquad (1),$$

a deceleration is performed (as shown at ① in FIG. 1) and the actual moving velocity of the (i+1)-th printing unit is a fifth virtual moving velocity (as indicated at $V_{i-1}$ in FIG. 1) at the (i+1)-th printing unit (of the next line) which is determined by decelerating from the actual moving velocity (as shown at ⓪ in FIG. 1) at the i-th printing unit (of the present line) in accordance with a predetermined decelerating rate.

In other words, in case a printing unit (in line) having a lower printing velocity than the deceleration curve A of FIG. 1 is present at the (i+k)-th printing unit (of the succeeding k-th line), the deceleration is conducted by using the fifth virtual moving velocity $V_{i-1}$ as the actual moving velocity at the (i+1)-th printing unit (of the next line).

As shown in FIG. 1, moreover, by using as a third virtual moving velocity $V_{i+1}$ (as shown at ③ in FIG. 1) at the (i+1)-th printing unit (of the next line) the moving velocity $V_{i+1}$ which is determined by accelerating from the actual moving velocity $V_i$ at the i-th printing unit (of the present line) in accordance with a preset accelerating rate, a fourth virtual moving velocity at the (i+k)-th printing unit (of the succeeding k-th line) which is determined by decelerating from the aforementioned third virtual moving velocity according to a predetermined deceleration rate is expressed by $V_k = V_{i-k+2}$. An acceleration curve B appearing in FIG. 1 designates a set of the fourth virtual moving velocity of $V_k = V_{i-k+2}$.

Incidentally, in FIG. 1, the deceleration curve A and the acceleration curve B are linear because the moving velocity and the lines are respectively equally scaled. Despite this fact, however, the present invention can also be applied to the case in which the decelerating (or accelerating) rate at each moving velocity is not equal (then the curves are non-linear).

In the present embodiment, it is determined the actual moving velocity at the (i+1)-th printing unit (of the next line) is to be accelerated from the actual moving velocity $V_i$ to $V_{i+1}$ in accordance with said acceleration curve B and the printing velocity at the (i+k)-th printing unit (of the succeeding k-th line).

In case the printing velocity $W_k$ at the (i+k)-th printing unit (of the succeeding k-th line) is equal to or higher than the fourth virtual moving velocity $V_{i-k+2}$ at the (i+k)-th printing unit (of the succeeding k-th line), i.e., in the following case:

$$W_k \geq V_{i-k+2} \qquad (2),$$

an acceleration is conducted by using the third virtual moving velocity $V_{i+1}$ (as shown at ③ in FIG. 1) at the (i+1)-th printing unit (of the next line) as the actual moving velocity at the (i+1)-th printing unit (of the next line). In other words, in case the printing unit (in line) having a lower printing velocity than the acceleration curve B of FIG. 1 is not present in the (i+k)-th printing unit (of the succeeding k-th line), the acceleration is conducted by using the third virtual moving velocity $V_{i+1}$ as the actual moving velocity at the (i+1)-th printing unit (of the next line).

In FIG. 1, moreover, in case the printing velocity $W_k$ at the (i+k)-th printing unit (of the succeeding k-th line) is equal to or higher than the second virtual moving velocity $V_{i-k+1}$ at the (i+k)-th printing unit (of the succeeding k-th line) and lower than the fourth virtual moving velocity $V_{i-k+2}$ at the (i+k)-th printing unit (of the succeeding k-th line), i.e, in the following case:

$$V_{i-k+1} \leq W_k < V_{i-k+2} \qquad (3),$$

an equal velocity is effected (as shown at ② in FIG. 1) by using the first virtual moving velocity $V_i$ at the (i+1)-th printing unit (of the next line) as the actual moving velocity at the (i+1)-th printing unit (of the next line).

In other words, in case the printing unit (the line) having a printing velocity not lower than the deceleration curve A of FIG. 1 but lower than the acceleration curve B is present at the (i+k)-th printing unit (of the succeeding k-th line), the uniform velocity is conducted by using the first virtual moving velocity $V_i$ as the actual moving velocity at the (i+1)-th printing unit (of the next line).

Incidentally, in case the printing velocity at the (2i+1)-th or succeeding printing unit is unknown, it is determined whether the moving velocity at the (i+1)-th printing unit is to be made uniform or decelerated in accordance with the printing velocity at the 2i-th printing unit (of the succeeding i-th line).

Thus, according to the present embodiment, it is possible to realize paper feed which incorporates no abrupt stops while making the best use of the printing velocity.

Figure 2:
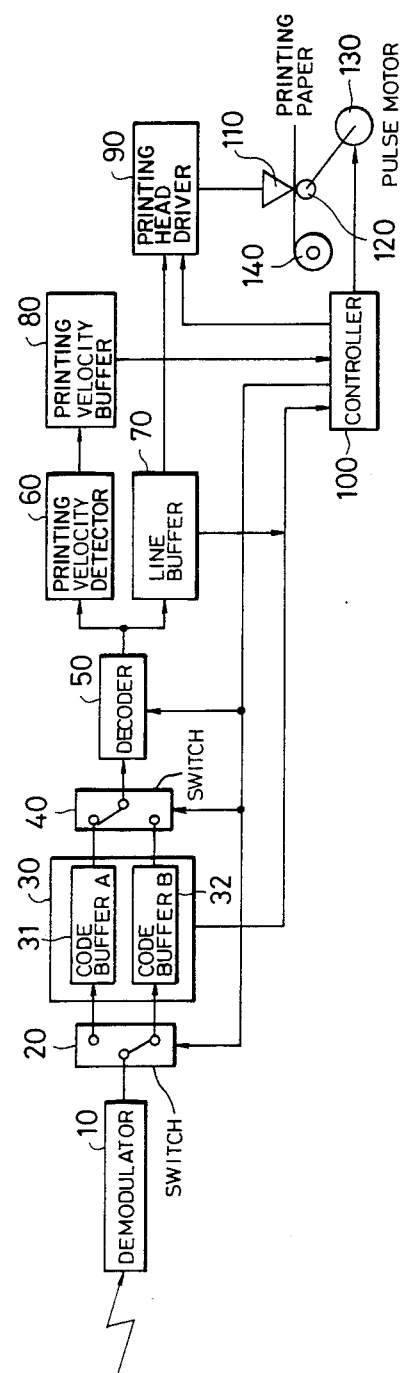
FIG. 2 is a block diagram showing the data flow in case the present invention is applied to a facsimile receiver.

FIG. 2 is a block diagram showing the data flow of one embodiment in which the present invention is applied to a high-speed facsimile receiver of thermal printing type.

In FIG. 2: reference numeral 10 indicates a demodulator; numeral 20 a switch; numeral 30 a code buffer; numeral 40 a switch; numeral 50 a decoder; numeral 60 a printing velocity detector; numeral 70 a line buffer for storing image signals temporarily; numeral 80 a printing velocity buffer for storing the printing velocity of each line in the line buffer; numeral 90 a printing head driver; numeral 100 a controller; numeral 110 a thermal printing head acting as recording printing means; numeral 120 a roller; numeral 130 a stepping motor acting as moving means for conducting the paper feed; and numeral 140 printing paper.

The operations of the high-speed facsimile receiver will be described in the following.

Analog signals transmitted from a transmitter via an analog telephone circuit are transformed into digital signals by the demodulator 10. In the international standards of G3FAX, the communications are performed in redundancy-suppressed codes called the "Modified Huffman codes (i.e., MH codes)", and the aforementioned digital signals corresponds to the MH codes. The code buffer 30 is divided into code buffers A31 and B32. The printing is started from the standpoint when the code buffer A31 or B32 is fully occupied. The switches 20 and 40 enable the codes being transmitted during the printing to be received. The decoder 50 decodes and transforms the codes into the original image signals. The image signals from the decoder 50 are sent to and stored in the line buffer 70 and are sent to the printing velocity detector 60. This printing velocity detector 60 calculates the number of black picture elements in the image signals to compute the printing velocity of each line. The printing velocity buffer 80 stores temporarily the printing velocity of each line for providing the printing unit in the line buffer. With the velocity of the stepping motor 130 being divided into N stages, the printing velocities of N lines after the present printing line could be known at all times so long as codes to be decoded are present in the code buffer 30, the line buffer 70 had a capacity of N lines or more and the decoder 50 could decode faster than the printing velocity. The controller 100 controls the conduction of the paper feed by determining the paper feeding velocity for providing the moving velocity of the next line or the (i+1)-th printing unit, by the method described with reference to FIG. 1, from the printing velocity of each line stored in the printing velocity buffer 80, by giving a command to the printing driver 90 to energize the thermal printing head 110 thereby to print the printing paper 140 with the image signals of one line, and by driving the stepping motor 130 in accordance with the aforementioned determined moving velocity to move relatively the printing paper for each printing unit. The decoder 50, which is exemplified by the LSI processor HD62L353 of Hitachi, Ltd. [i.e., FCP (i.e., Facsimile Coded Processor) described in Image Technology Branch of Association of Electronic Communications, IE-17] for decoding the MH codes, can decode the MH codes at a velocity of 400 kbps or higher, i.e,. 50 lines/sec to 100 lines/sec, which is the printing velocity of G3FAX. If the paper feeding velocity of the present line being printed is designated at $V_i$, the uniform velocity or deceleration is conducted, in case the decoding processing is delayed or the codes to be decoded are exhausted so that the iamge signals stored in the line buffer 70 become short from the succeeding (i+1)-th line, and the deceleration is conducted in case the image signals stored in the line buffer 70 become short from the succeeding i-th line. Similar results can be attained even if because the printing velocities of the absent lines in the line buffer 70 are zero the paper feeding velocity of the next line is determined from the decelerating curve A and accelerating curve B. If the paper feeding velocity is determined by the method described above, smooth paper feed at a high velocity but without any abrupt stop can be realized with a reduced line buffer capacity.

Figure 3:
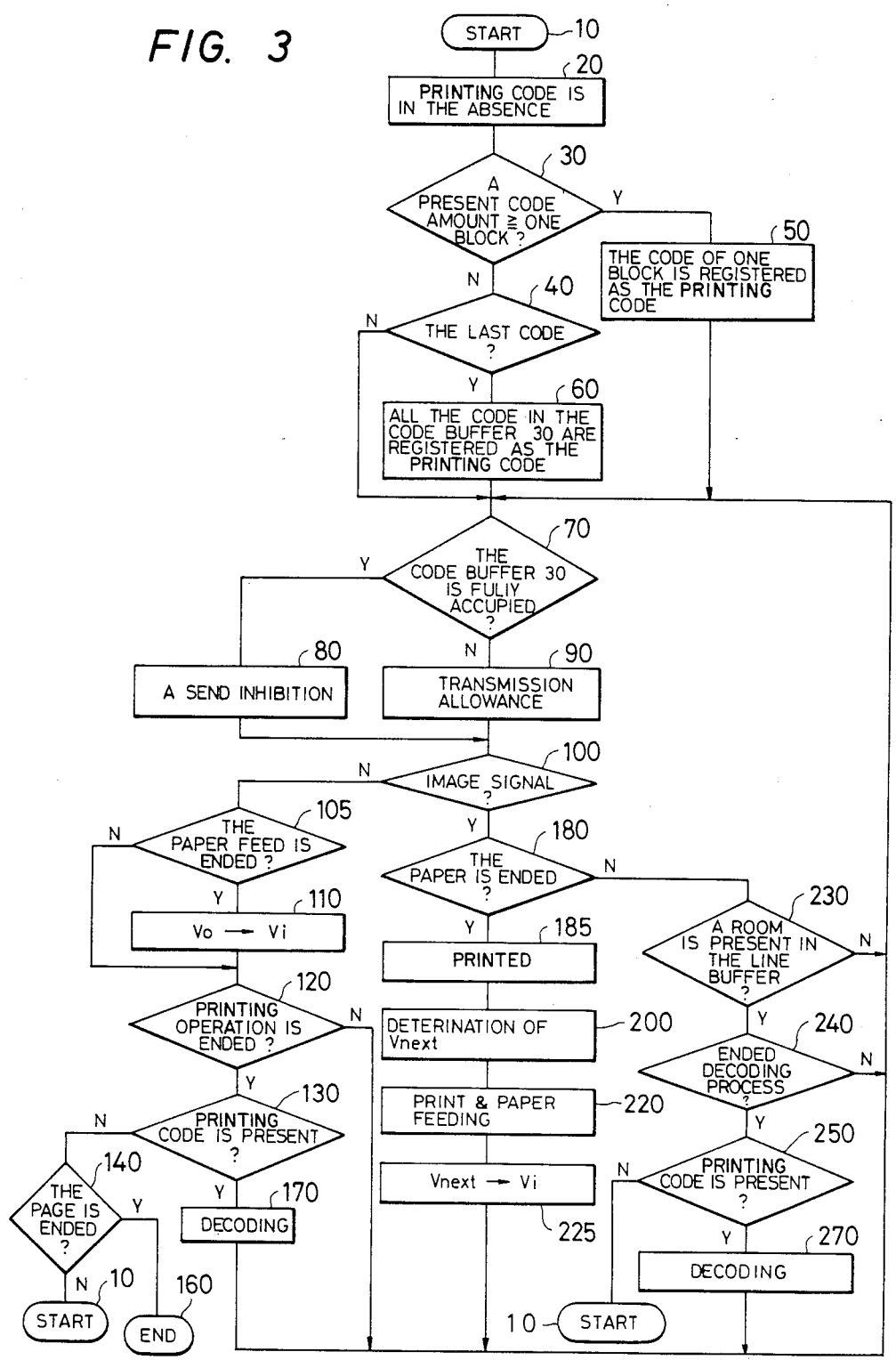
FIG. 3 is a processing flow chart in case the present invention is applied to the facsimile receiver.

FIG. 3 is a flow chart for explaining the processing flow of the controller 100 of FIG. 2.

Either at the start of a page or when no code to be printed is stored in the code buffer 30, the processing is started from a start terminal 10. At a processing 20, an initial state is caused in the absence of the code to be printed (which will be called the "printing code"). At a judgement 30, it is judged whether or not the code buffer 30 is stored with a code equal to or more than a preset code amount (which will be called the "code of one block") advances to a judgement 40 if NO and to a processing 50 if YES. At the processing 50, the code of one block is registered as the printing code. At the judgement 40, it is judged whether or not the last code of a page is stored in the code buffer 30. The processing advances to a processing 60 if YES and to a judgement 70 if NO. At the processing 60, all the codes in the code buffer 30 are registered as the printing codes. At the judgement 70, it is judged whether or not the code buffer 30 is fully occupied. The processing advances to a processing 80 if YES and to a processing 90 if NO. At the processing 80, a send inhibition is commanded to the transmitting side because of the full occupancy of the code buffer to prevent the code buffer 30 from any overflow. This state occurs in case the transmitting velocity is higher than the printing velocity. At the processing 90, a transmission allowance is commanded to the transmission side to indicate that the code buffer 30 can receive. At a processing 100, it is judged whether or not image signals of one line or more are present in the line buffer. The processing advances to a judgement 180 if YES and to a judgement 105 if NO. At this judgement 105, it is judged whether or not the paper feed is ended. The processing advances to a processing 110 if YES and to a judgement 120 if NO. At the processing 110, no image signal to be printing is present in the line buffer 70, and the paper feed is ended so that the stepping motor 130 is interrupted. Therefore, the paper feeding velocity $V_i$ of the present line is set at $V_0$. At the judgement 120, it is judged whether or not the decoder 40 is in is decoding operation. The processing returns to the judgement 70 if YES and advances to a judgement 130 if NO. At this judgement 130, it is judged whether or not the printing code is present. The processing advances to a processing 170 if YES and to a judgement 140 if NO. At the processing 140: the printing code is present in the code buffer 30; a room is present in the line buffer 80; and the decoder 50 has ended its decoding process. Therefore, a decoding command is sent to the decoder 50 until the processing returns to the judgement 70. At the judgement 140, it is judged whether or not the processing of the last code of the page is ended. The processing advances to an end terminal 160, if YES to end the printing of the one page, and returns to the start terminal 10 if NO. For a period after the end of the printing and before the presence of the printing code, the processings of 10→20→30→40→70→90→100→105→110→120→130→140→10 are repeated until the printing code is registered. If, meanwhile, the printing code is registered at the processing 50 or 60, the processing advances in the order of 70→90→100→105→110→120→130→170, at which the printing code is decoded so that the image signals are stored in the line buffer 70. After this, the processing advances in the order of 70→90→100, at which the image signals are present in the line buffer 70 so that the processing advances further to the judgement 180. At this judgement 180, it is judged whether or not the paper feed of the present printing line has been ended. The processing advances to a processing 185 if YES and to a judgement 230 if NO. At the processing 185, the image signals of the next printing line in the line buffer 70 are transferred to the printing driver 90. At a processing 200, the printing velocity $V_{next}$ of the next line is determined from the printing velocity of the image signals in the line buffer 70 in accordance with the method described with reference to FIG. 1. At a processing 220, the recording head 110 is energized through the recording driver 90 to print the image signals on the recording paper 140, and the pulse motor 130 is driven at the paper feeding velocity $V_{next}$ determined at the processing 200 to effect the paper feed. At a processing 225, the judgement 70 is returned to by using the velocity $V_{next}$ as the paper feeding velocity $V_i$ of the present printing line. During the printing of the first line, the processing advances in the order of 70→90→100→105→120→130→170, at which the image signals are stored in the line buffer. After this, the processing advances in the order of 70→90→100→180→230 until the paper feed is ended. At the judgement 230, it is judged whether or not room is present in the line buffer 70. The processing advances to a judgement 240 if YES and returns to the judgement 70 if NO. At the judgement 240, it is judged whether or not the decoding process has been ended. The processing advances to a judgement 250 if YES and returns to the judgement 70 if NO. At the judgement 250, it is judged whether or not the printing code is present. The processing advances to a processing 270 if YES and returns to the start terminal 10 is NO. At the processing 270, a decoding command is transmitted to the decoder 50 to effect the decoding processing until it returns to the judgement 70. Thus, during the paper feed, the processing advances in the order of 70→90→100→180→230→240→250→270 to effect the decoding operation so long as room is present in the line buffer 70 and the printing code is present in the code buffer 30. As a result, so long as the decoding velocity is higher than the printing velocity, the line buffer 70 is in its fully occupied state so long as the printing code is present. Thus, if the paper feeding velocity for providing the moving velocity is determined in accordance with the operation flow shown in FIG. 3, it is possible to realize the smooth paper feed while making the best use of the printing velocity.

FIG. 11 shows the flow chart of the processing 200 of FIG. 3.

Next, the present invention will be described in connection with a concrete example.

Figure 4:
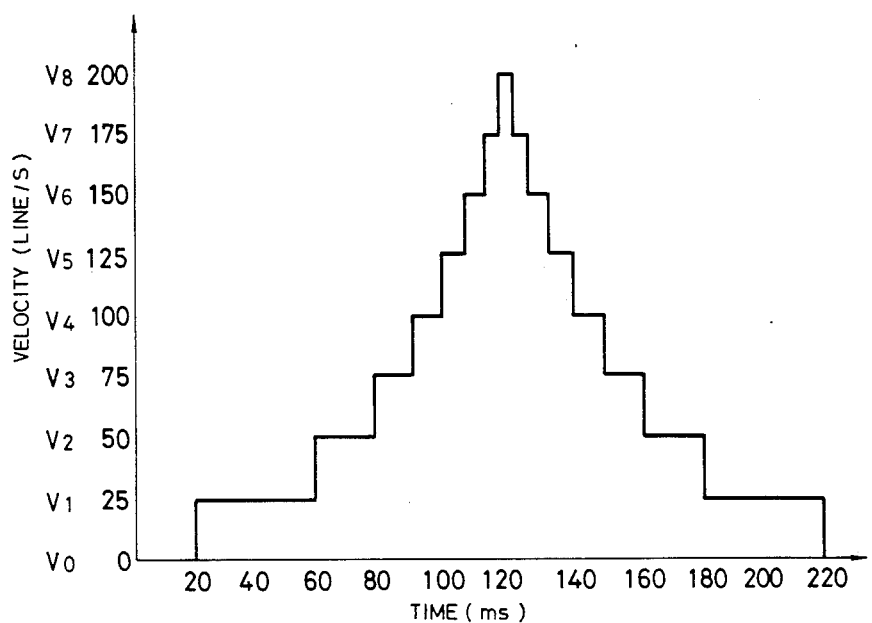
FIG. 4 is a diagram showing one example showing an acceleration-deceleration characteristic curve of a stepping motor.
Figure 5:
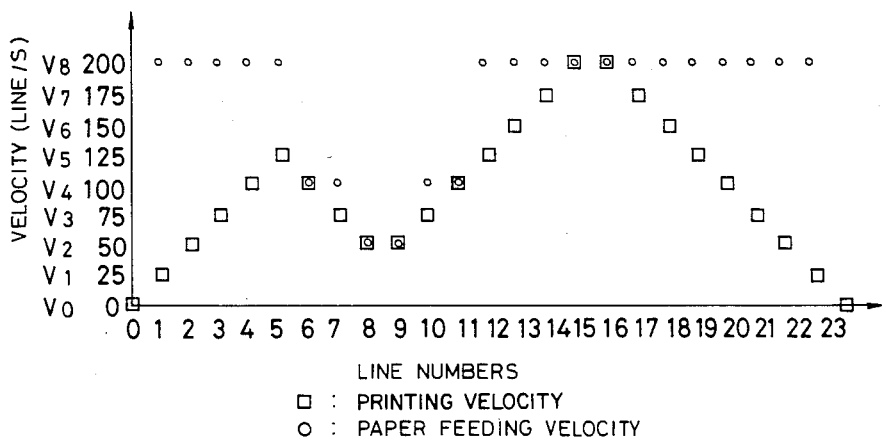
FIG. 5 is a diagram showing one example of a change of a paper feeding velocity when the present invention is applied.

FIG. 4 shows one example of the accelerating and decelerating characteristic curves of the stepping motor. The setting is made such that the unevenness of the paper feed can be suppressed below a predetermined value if the acceleration and deceleration are conducted in accordance with those characteristic curves. The abscissa designates the time, and the ordinate designates the paper feeding velocity. FIG. 5 is a diagram showing the paper feeding velocities of the individual lines, which are determined in accordance with the moving velocity determining method described with reference to FIG. 1 when the image information shown in FIG. 12 is received by the facsimile receiver equipped with the stepping motor having the accelerating and decelerating characteristic curves shown in FIG. 4.

In FIG. 12: the transmission period designates the period for which the codes of each line are transmitted; the black percentage designates the ratio of the black picture elements in the image signals of each line; the whole white designates that one line is composed wholly of white picture elements; the small black percentage designates that the ratio of the black picture elements is small; and the large black percentage designates that the ratio of the black picture elements is large. It is assumed that the velocity of the whole white line be 200 lines/sec, i.e, the highest velocity of the stepping motor, that the velocity of the line of the small black percentage be 100 lines/sec, and that the printing velocity of the line of the large black percentage be 50 lines/sec.

In FIG. 5, the abscissa designates the line number whereas the ordinate designates the paper feed for providing the printing velocity and the moving velocity. Dot symbols indicate the printing velocity of each line determined from FIG. 12, and square symbols indicate the paper feeding velocity for providing the moving velocity determined by the method shown in FIG. 1. From FIG. 5, it is found that the paper feeding velocity for providing the moving velocity is varied smoothly while the printing velocity being effectively used to the best.

Figure 6A:
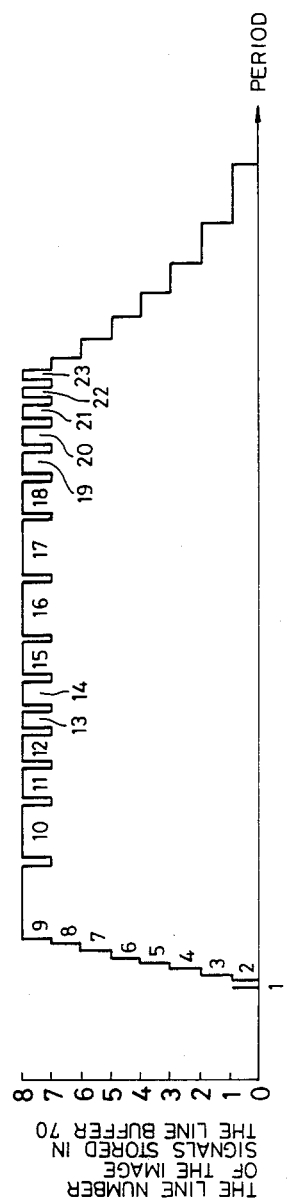
FIG. 6 is a diagram showing examples of the time charts on the number of stored lines and the paper feeding velocity.
Figure 6B:
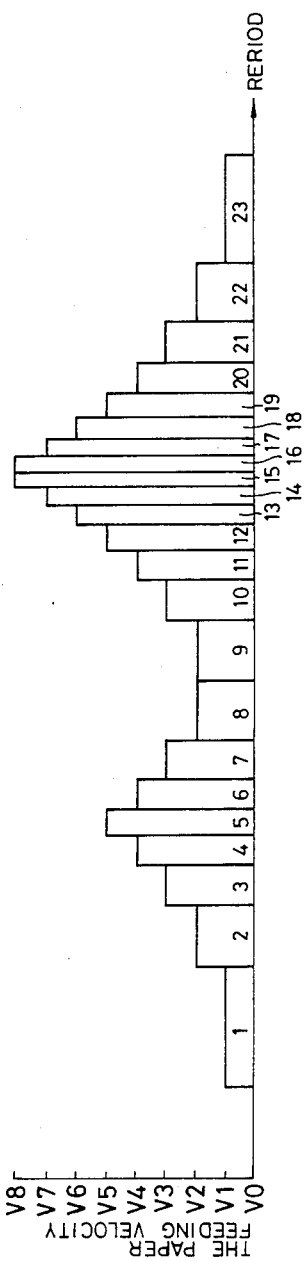

FIG. 6 shows an example in which the image information shown in FIG. 12 is processed practically by the system described with reference to FIGS. 2 and 3. In FIG. 6(a), the abscissa designates the period, and the ordinate designates the line number of the image signals stored in the line buffer 70. The abscissa of FIG. 6(b) designates the period identical to that of the abscissa of FIG. 6(a). The time period of each line required for the coding is set at 2 millisecs. Since the paper feeding velocity has eight steps, the capacity of the line buffer 70 is set for the eight lines. FIG. 6 is a time chart when the codes in an amount larger than that for one block are stored at the instant the codes of 23 lines shown in FIG. 12 are stored and when the processing advances from the judgement 30 to the processing 50 of FIG. 3 so that the printing operation is started. From FIG. 6, it is found that the smooth paper feed can be realized while the printing velocity being effected to the best by the line buffer having the storage capacity of the number of steps of the paper feeding velocity by the paper feed controlling method of the present embodiment described with reference to FIGS. 2 and 3.

From FIG. 6(b), moreover, according to the present embodiment, there can be attained an effect that a printing unevenness is reluctant to occur due to the cooling of the thermal printing head thanks to the short printing stop period because the paper feeding stop is not caused before all the codes of at least one block are printed. Another effect is that a high-speed printing can be effected because of the less cooled head. A further effect is that the power consumption can be reduced because of the less cooled head.

FIG. 7 is a time chart when the image information shown in FIG. 12 is printed by the method of decoding the inputted codes sequentially but not from the instant when the codes of one block are stored in the code buffer.

Figure 7A:
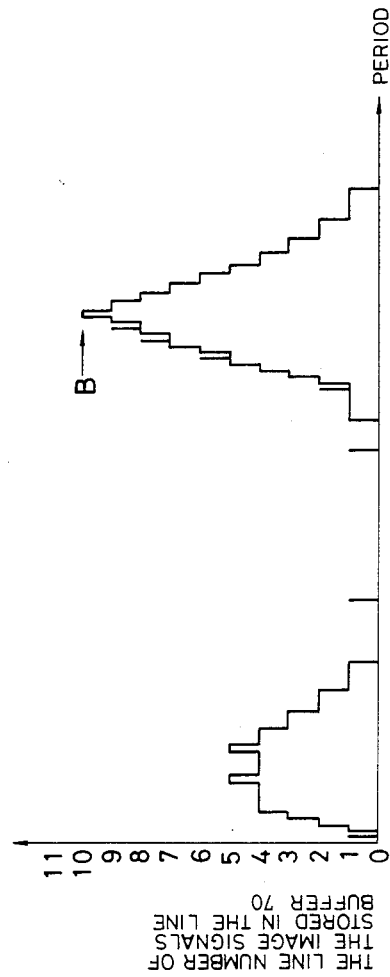
FIG. 7 is a time chart showing the number of stored lines and the paper feeding velocity in the absence of a code buffer storage control.
Figure 7B:
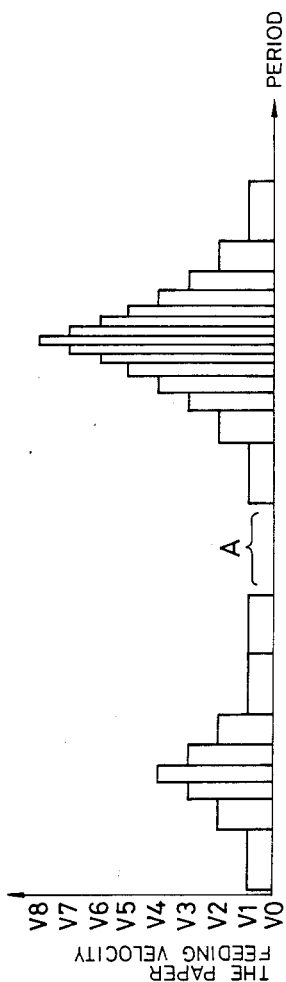

In FIG. 7(a), the abscissa designates the period, and the ordinate designates the line number of the image signals stored in the line buffer. In FIG. 7(b), the abscissa designates the period, and the ordinate the paper feeding velocity for providing the moving velocity. The abscissa of FIG. 7(a) is identical to that of FIG. 7(b). According to the present method, as indicated at A in FIG. 7(b), the paper feed stop period may occur, when the lines (as indicated at 8 and 9 of FIG. 12) of the long transmission time are received, to interrupt the printing for a long time period. As indicated at B in FIG. 7(a), on the other hand, the image signals to be stored in the line buffer are increased if a number of lines of short transmission time periods are received continuously.

Figure 8:
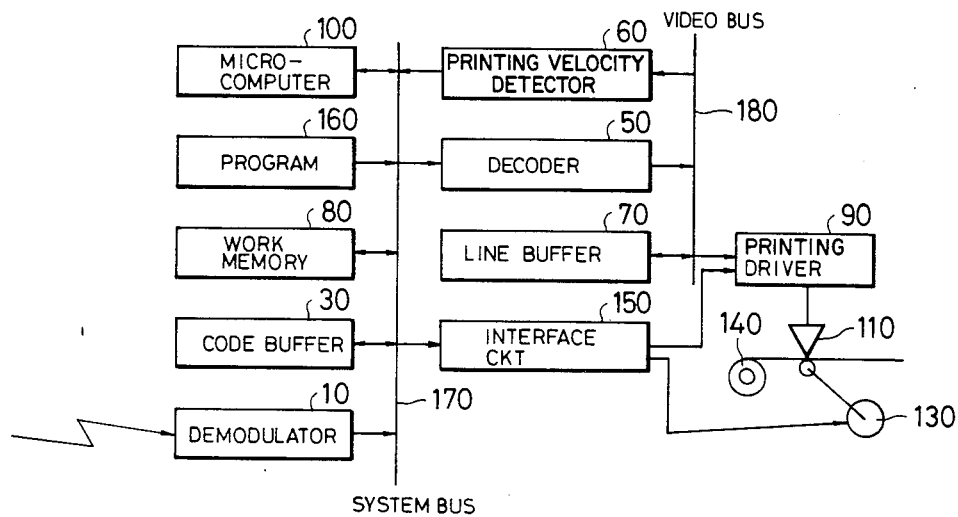
FIG. 8 is a block diagram showing an example of the circuit construction in case the present invention is applied to the facsimile receiver.

FIG. 8 is a block diagram showing the circuitry of one embodiment in case the present invention is applied to the facsimile receiver. Indicated at reference numeral 100 is an overall controller which is usually constructed of a micro computer (which will be referred to as the "micom"). Indicated at numeral 160 is a memory for storing the program of the micom 100, which is usually exemplified by an ROM (i.e., Read Only memory). This ROM 160 is stored with the program corresponding to the operation flow shown in FIG. 3. Indicated at numeral 80 is a work memory of the micom 100, which is usually exemplified by an RAM (i.e., Random Access Memory). The work memory 80 is stored with the information necessary for the micom 100 to operate, e.g., the printing velocities of the individual lines. Indicated at numeral 30 is a code buffer which is usually exemplified by the RAM. Numeral 10 indicates a demodulator. Indicated at numeral 50 is a decoder which is exemplified by the Hitachi HD62L353(FCP). Indicated at numeral 60 is a printing velocity detector, which is constructed of a counter for counting the number of black picture elements if the facsimile receiver is of the thermal printing system in which the printing velocity fluctuates in accordance with the number of the black picture elements. Indicated at numeral 70 is a line buffer for storing the image signals, which is usually exemplified by the RAM . Numeral 90 indicates a printing driver. Indicated at numeral 150 is an interface circuit for outputting a printing command from the micom 100 to the printing driver 90 or motor driving pulses from the micom 100 to the paper feeding motor 130. Numerals 110 and 140 indicate a the thermal printing head and printing paper, respectively. Indicated at numeral 170 is a system bus through which codes, programs, control information and so on are fed to the individual devices connected therewith. Indicated at numeral 180 is a video bus through which the image signals are fed to individual devices connected therewith.

The operations of the facsimile receiver will be described in the following.

The codes received are demodulated by the demodulator 10 and are stored through the system bus 170 in the code buffer 30. In response to the command from the micom 100, the decoder 50 inputs and decodes the codes stored in the code buffer 30 through the system bus 170 into the image signals and store the image signals in the line buffer 70 through the video bus 180 and output the image signals to the printing velocity detector 60. The micom 100 stores the printing velocities of the individual lines, i.e., the outputs for the printing velocity detector 60 in the work memory 80 through the system bus 170. The micom 100 monitors so that the line buffer 70 may not overflow, and produces a decoding command to the decoder 50 when room is present in the line buffer 70. The micom 100 monitors the codes in the code buffer 30 and effects the at the instant when the quantity of storage reaches that of one block. Upon the printing, the micom 100 outputs not only the image signals of one line in the line buffer 70 to the printing driver 90 through the video bus 180 but also the printing command corresponding to the printing velocity in the work memory to the printing driver 90 through the interface 150 to output the drive pulses to the paper feed motor 130 through the interface 150 in accordance with the paper feeding velocity for providing the moving velocity, which is determined from the printing velocity of each line in the work memory 80 by the method explained with reference to FIG. 1, thereby to execute the printing and paper feeding operations.

Figure 9:
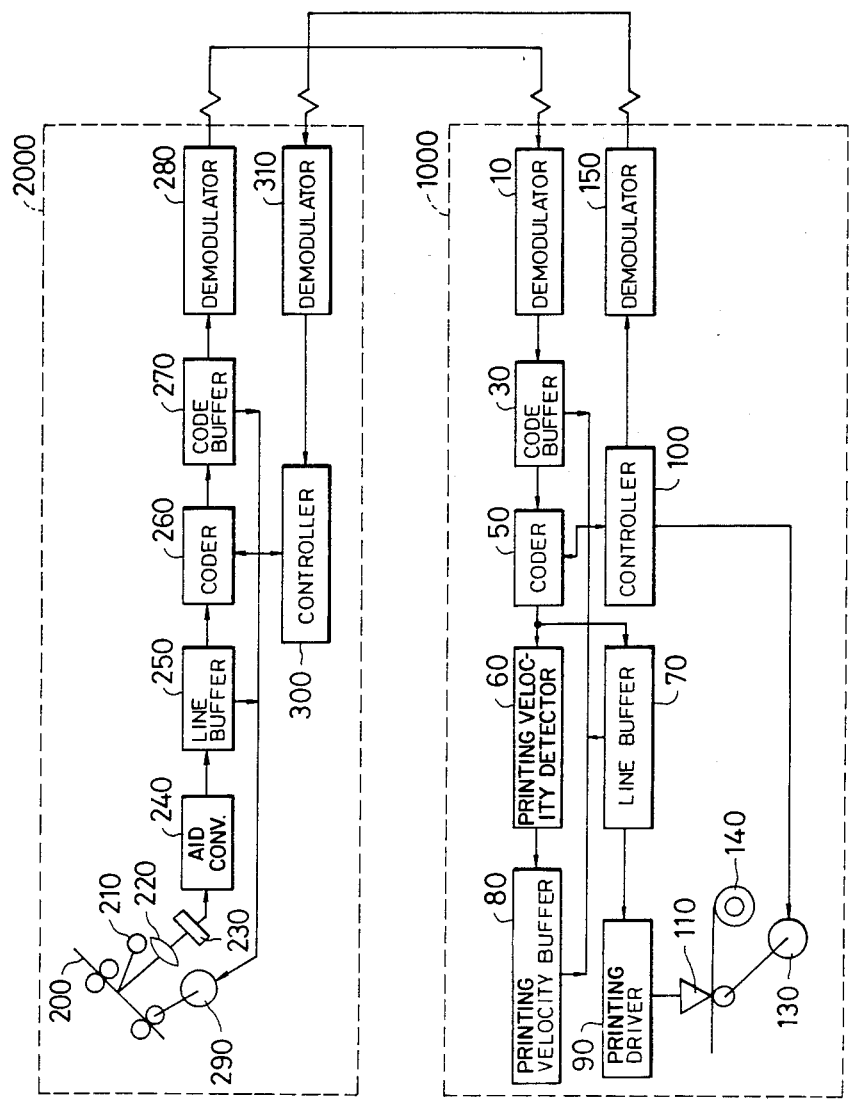
FIG. 9 is a block diagram showing the data flow in the case of communication with a facsimile transmitter.

FIG. 9 is a block diagram showing the flow of the data upon communications with the facsimile transmitter. Reference numeral 2000 indicates the whole structure of the facsimile transmitter; numeral 200 an original to be transmitted; numeral 210 a fluorescent lamp; numeral 220 a lens; numeral 230 a photoelectric converting element such as CCD (i.e., Charge Coupled Device); numeral 240 an analog-to-digital converter for transforming analog video signals into bi-level black and white image signals; numeral 250 a line buffer for storing the image signals temporarily; numeral 260 a coder for suppressing redundancy contained in the image signals; numeral 270 a code buffer for storing codes temporarily; numeral 280 a demodulator; numeral 290 a motor for effecting the paper feed of the original 200; numeral 300 a controller for controlling the whole facsimile transmitter; and numeral 310 a demodulator. Numeral 1000 indicates the whole structure of the facsimile receiver; numeral 10 a demodulator; numeral 30 a code buffer; numeral 50 a decoder; numeral 60 a printing velocity detector; numeral 70 a line buffer; numeral 80 a printing velocity buffer; numeral 90 a printing driver; numeral 100 a controller for controlling the whole facsimile receiver; numeral 110 a thermal printing head; numeral 130 a paper feeding motor; numeral 140 printing paper; and numeral 150 a demodulator.

The flow of the signals will be described in the following.

The image signals produced by scanning the original 200 are once stored in the line buffer 250 and are then coded by the coder 260. These codes are once stored in the code buffer 270 and are then modulated by the modulator 280 until they are transmitted to a telephone circuit. The receiver 1000 demodulates the signals transmitted from the transmitter 2000 into the original codes by means of the demodulator 10. The codes thus demodulated are once stored in the code buffer 30 and are then decoded to the original image signals by the decoder 50. The image signals thus decoded are once stored in the line buffer 70, and the printing velocities of the individual lines are detected by the printing velocity detector 60 until they are stored in the printing velocity buffer 80. The controller 100 determines the paper feeding velocity from the quantity of the code stored in the code buffer 30, the quantity of the image signal stored in the line buffer 70, and the printing velocity stored in the printing velocity buffer 80. The controller 100 transfers the image signals in the line buffer 70 to the printing driver 90 to print them in the printing paper 140 and outputs the drive pulses to the paper feed motor to execute the paper feed in accordance with the aforementioned determined paper feeding velocity. When the recording velocity is lower than the transmitting velocity to cause a danger that the code buffer 30 may overflow, the controller 100 transmits a code transmission stopping signal to the transmitter 2000 through the demodulator 150. The code transmission stopping signal is inputted through the demodulator 310 to the controller 300. Upon reception of this code transmission stopping signal, the controller 300 stops the transmission of the codes and the scanning of the original 200 in case the danger of the overflow of the code buffer 270 takes place.

Figure 10:
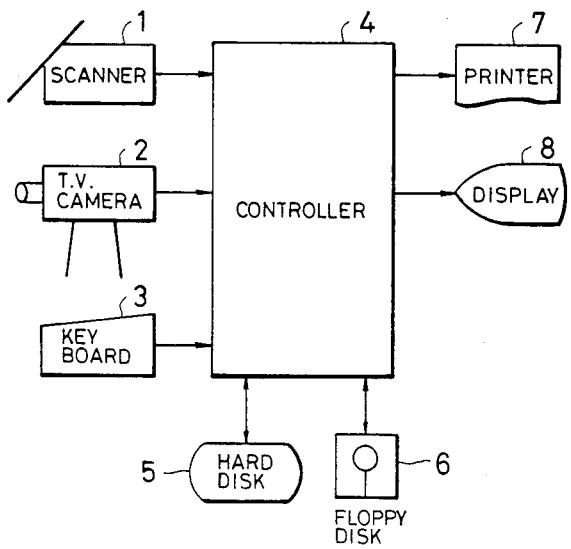
FIG. 10 is a block diagram showing the case in which the present invention is applied to a work station.

FIG. 10 is a block diagram of one example where the present invention is applied to a work station. Reference numeral 1 indicates a scanner for scanning the original to produce image signals; numeral 2 a TV camera; and numeral 3 a key board. Numerals 5 and 6 indicate a hard disk and a floppy disk, respectively, both of which store either the signals inputted from the scanner 1, the TV camera 2, the key board and so on or the signals prepared by editing and composing the former signals. Indicated at numeral 8 is a display for displaying either the signals inputted from the scanner 1, the TV camera 2 or the key board 3, or the signals from the hard disk 5 or the floppy disk 6. Indicated at numeral 7 is a printer for printing on the printing paper the image signals which are displayed on the display 8 by the movement control method according to one example of the present invention. Indicated at numeral 4 is a controller for controlling the whole work station, which is used to control the peripheral devices and the paper feed or the image signal coding or decoding of the present invention.

Figure 13A:
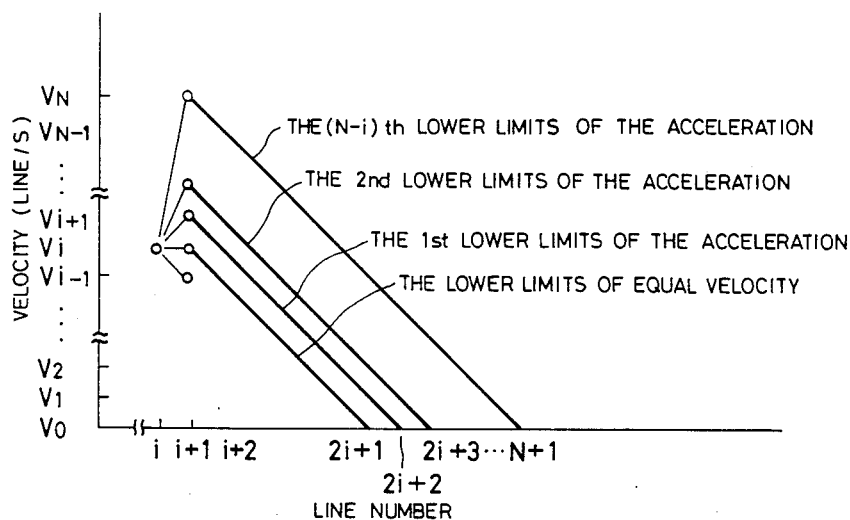
FIGS. 13 and 14 are diagrams showing other examples of the present invention.
Figure 13B:
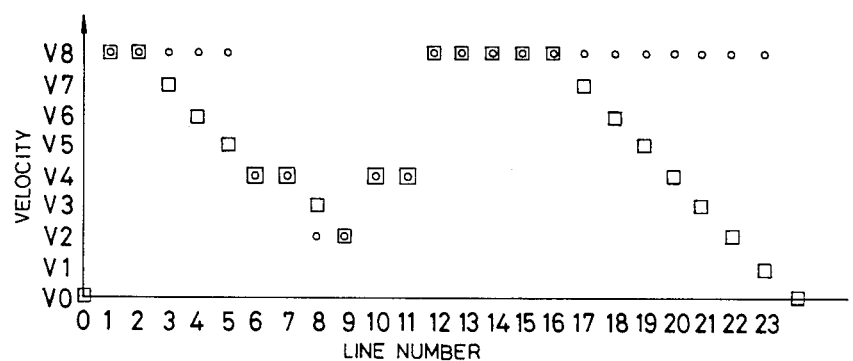

FIG. 13 is a diagram for explaining another embodiment of the movement controlling method for the printing paper according to the present invention. FIG. 13(a) corresponds to FIG. 1, whereas FIG. 13(b) corresponds to FIG. 5.

FIGS. 1 and 5 shows the embodiment in which both the accelerating and decelerating rates of the relative moving velocity of the paper are limited and preset (one stage by one stage, for example). FIG. 13 shows the embodiment in case the decelerating rate is preset (step by step, for example) whereas the accelerating rate is substantially unlimited.

In FIG. 13, since the accelerating rate is not limited, the third virtual moving velocity accelerated at an x-th step is used as the actual moving velocity at the (i+1)-th printing unit (of the next line) (where, $1 \leq X \leq N-1$), if a plurality (e.g., $N-1$ in FIG. 13(a)) of third virtual moving velocities, i.e., acceleration curves (or the lower limits of the acceleration) are present and if the line of the printing velocity lower than the x-th acceleration curve (or the lower limits of the acceleration) is not present.

The deceleration and the uniform velocity are conducted in the same concept as that of FIG. 1.

Figure 14:
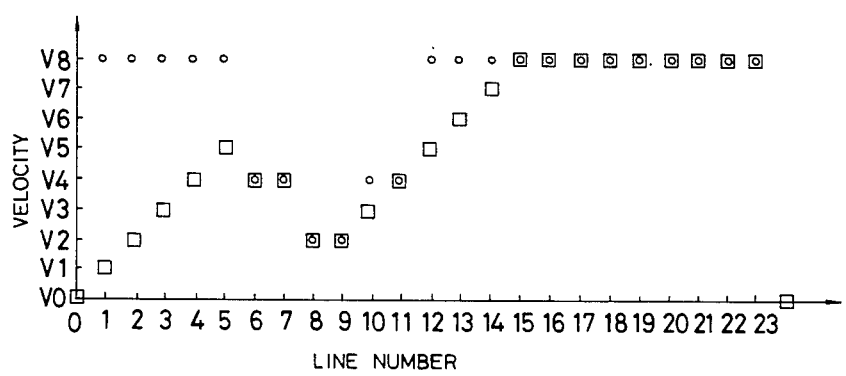

FIG. 14 is a diagram for explaining a further embodiment of the movement controlling method of the printing paper according to the present invention, and corresponds to FIG. 5.

FIGS. 1 and 5 show the embodiment in which both the accelerating and decelerating rates of the moving velocity when paper moves limited and predetermined. On the contrary, FIG. 14 shows the embodiment in case the accelerating rate is preset (one stage by one stage, for example) whereas the decelerating rate is substantially unlimited.

Since the decelerating rate is not limited in the case of the present embodiment, the actual moving velocity at an arbitrary printing unit can be made equal to or lower than the printing velocity at said arbitrary printing unit. As a result, the printing velocity at the (i+2)-th and later printing units need not referred to, but what of the acceleration, uniform velocity and deceleration is made of the actual moving velocity at the (i+1)-th printing unit (of the next line) can be determined if the printing velocity at the (i+1)-th printing unit (of the next line) is known.

More specifically, in case the printing velocity W at the (i+1)-th printing unit (of the next line) is equal to or higher than the second virtual moving velocity at the (i+1)-th printing unit, i.e., in the following case:

$$W \geq V_{i+1} \quad (4),$$

an acceleration is conducted by using the fifth virtual moving velocity $V_{i+1}$ (which is equal to the second virtual moving velocity in this case) as the actual moving velocity at the (i+1)-th printing unit (of the next line).

On the other hand, in case the printing velocity W at the (i+1)-th printing unit (of the next line) is lower than the second virtual moving velocity $V_{i+1}$ at the (i+1)-th printing unit (of the next line) and equal to or higher than the actual moving velocity $V_i$ at the i-th printing unit (of the present line), i.e., in the following case:

$$V_i \leq W < V_{i+1} \quad (5),$$

a uniform velocity is conducted by using the actual moving velocity at the i-th printing unit (of the present line) as the actual moving velocity at the (i+1)-th printing unit (of the next line).

On the other hand, in case the printing velocity W at the (i+1)-th printing unit (of the next line) is lower than the actual moving velocity $V_i$ at the i-th printing unit (of the present line), i.e., in the following case:

$$W < V_i \quad (6),$$

a deceleration is conducted by using the printing velocity W at the (i+1)-th printing unit (of the next line) as the actual moving velocity at the (i+1)-th printing unit (of the next line).

In the embodiments of the present invention thus far described, one line is used as the printing unit, however, in case a plurality of lines are to be printed at one time, it is to be understood that those lines can be deemed as one recording unit.

In FIGS. 1 and 5, on the other hand, both the accelerating and decelerating rates are preset one stage by one stage in an equal quantity. However, the present invention can also be applied to the case in which the preset accelerating rate and the preset decelerating rate are different.

According to the present invention, the facsimile receiver or the like is enabled to make effective use of the printing velocity at each printing unit without any fluctuation of the transmission time period each printing unit and to eliminate abrupt changes in the moving velocity. As a result, there can be attained a further effect that the printing and the paper feeding can be realized at a high speed and smoothly without any interruption.

What is claimed is:

1. A method of controlling movement of a print medium to be printed, including:
    printing means for printing image signals on a print medium as printing units of predetermined length, said printing units being printed at different printing velocities in accordance with the content of said image signals; and
    moving means for moving said print medium, based on said printing units at a predetermined decelerating or accelerating rate of a moving velocity;
    the method comprising steps of:
    assigning an actual moving velocity at an arbitrary i-th (wherein i=1, 2, 3 - - - , and I) printing unit to be used as a first virtual moving velocity at an (i+1)-th printing unit, and
    determining an actual moving velocity for said print medium at said (i+1)-th printing unit based on a second virtual moving velocity at an (i+k)-th (wherein k=1, 2, - - - , $\leq$I−i) printing unit, which is determined by decelerating or accelerating from said first virtual moving velocity at said (i+1)-th printing unit in accordance with said predetermined decelerating or accelerating rate, respectively, and a printing velocity at said (i+k)-th printing unit.

2. A method according to claim 1, wherein said actual moving velocity at said (i+1)-th printing unit is determined to be equal to or lower than the printing velocity at said (i+1)-th printing unit.

3. A method according to claim 1, wherein, when said printing velocity of said (i+k)-th printing unit is lower or higher than said second virtual moving velocity at said (i+k)-th printing unit, another virtual moving velocity at said (i+1)-th printing unit, which is determined by decelerating or accelerating from said actual moving velocity at said i-th printing unit in accordance with said decelerating rate, respectively, is used as said actual moving velocity for said print medium at said (i+1)-th printing unit.

4. A method according to claim 3, wherein k is increased sequentially from 1.

5. A method of controlling the movement of a print medium to be printed, including:
    printing means for printing image signals on a print medium as printing units of predetermined length, said printing units being printed at different printing velocities in accordance with the content of said image signals; and
    moving means for moving said print medium, based on said printing units at a predetermined decelerating or accelerating rate of a moving velocity,
    the method comprising the steps of:
    determining an actual moving velocity for said print medium at said (i+1)-th printing unit based on an actual moving velocity at an arbitrary i-th (wherein i=1, 2, 3 - - - , and I) printing unit to be used as a first virtual moving velocity at an (i+1)-th printing unit;
    a second virtual moving velocity at an (i+k)-th (wherein k=1, 2, - - - , $\leq$I−i) printing unit, which is determined by decelerating or accelerating from said first virtual moving velocity at said (i+1)-th printing unit in accordance with said predetermined decelerating or accelerating rate, respectively;

a third virtual moving velocity at said (i+1)-th printing unit, which is determined by accelerating or decelerating from said actual moving velocity at said i-th printing unit, in accordance with an arbitrary accelerating or decelerating rate, respctively;

a fourth virtual moving velocity at said (i+k)-th printing unit, which is determined by decelerating or accelerating from said third virtual moving velocity of said (i+1)-th printing unit, in accordance with said decelerating or accelerating rate, respectively; and a printing velocity at said (i+k)-th printing unit.

6. A method according to claim 5, wherein said actual moving velocity at said (i+1)-th printing unit is determined to be equal to or lower than the printing velocity at said (i+1)-th printing unit.

7. A method according to claim 6, wherein: when said printing velocity at said (i+k)-th printing unit is lower or higher than said second virtual moving velocity at said (i+k)-th printing unit, a fifth virtual moving velocity at said (i+1)-th printing unit, which is determined by decelerating or accelerating from said actual moving velocity at said i-th printing unit, in accordance with said decelerating or accelerating rate, respectively; is used as said actual moving velocity at said (i+1)-th printing unit;

When said printing velocity at said (i+k)-th printing unit is equal to or higher than said second virtual moving velocity at said (i+k)-th printing unit and lower than said fourth virtual moving velocity at said (i+k)-th printing unit, said first virtual moving velocity at said (i+1)-th printing unit is used as said actual moving velocity at said (i+1)-th printing unit; and when said printing velocity at said (i+k)-th printing unit is equal to or higher than said fourth virtual moving velocity at said (i+k)-th printing unit, said third virtual moving velocity at said (i+1)-th printing unit is used as said actual moving velocity at said (i+1)-th printing unit.

8. A method according to claim 7, wherein k is increased sequentially from 1.

* * * * *